M. D. THOMPSON.
DEVICE FOR FACILITATING THE RUNNING OF PIPING.
APPLICATION FILED APR. 20, 1914.

1,118,970.

Patented Dec. 1, 1914.

WITNESSES
Florence Young
Charles L. Foster

INVENTOR
Milton D. Thompson
by Reginald Orville
Attorney.

UNITED STATES PATENT OFFICE.

MILTON D. THOMPSON, OF SOUTH PORTLAND, MAINE, ASSIGNOR TO THE THOMPSON PROPELLER COMPANY, OF PORTLAND, MAINE, A CORPORATION OF MAINE.

DEVICE FOR FACILITATING THE RUNNING OF PIPING.

1,118,970. Specification of Letters Patent. Patented Dec. 1, 1914.

Application filed April 20, 1914. Serial No. 833,190.

*To all whom it may concern:*

Be it known that I, MILTON D. THOMPSON, a citizen of the United States, residing at South Portland, in the county of Cumberland and State of Maine, have invented certain new and useful Improvements in Devices for Facilitating the Running of Piping, of which the following is a specification.

This invention relates to improvements in devices for the running of piping through walls and floors where it is often inconvenient to aproach the wall or floor at right angles thereto. Its object is to provide a terminal or coupling for the pipe adapted to be readily moved relative to the wall or floor to receive a pipe presented thereto at any one of a plurality of angles to the wall or floor.

To this end my invention consists of a sphere tapped at one or both ends to receive a pipe and means for supporting said sphere in the wall or floor consisting of two concave members adapted to receive the sphere with a close fit, said members being adapted to be joined together after the sphere is inserted by means of screws or other bonding devices, and one of said members being provided with a flange by which it is attached to the wall or floor.

Figure 1:
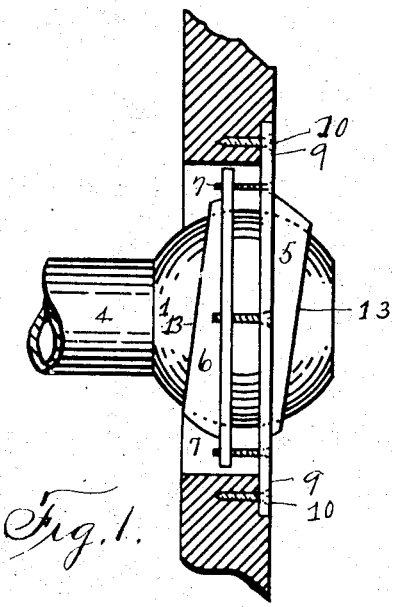
Figure 2:
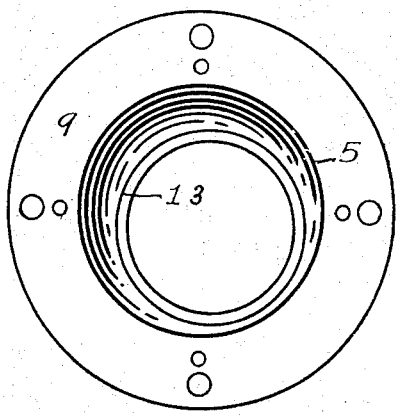
Figure 3:
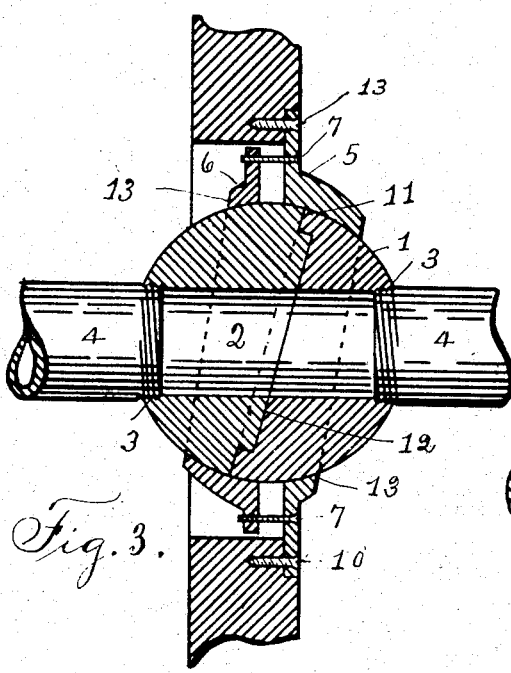
Figure 4:
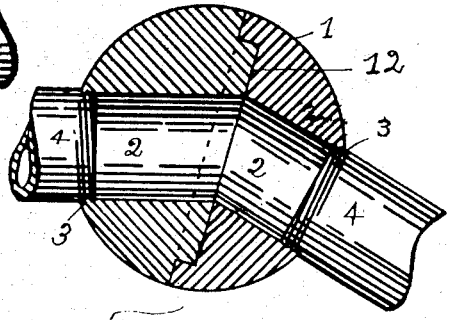

In the drawing herewith accompanying and making a part of this application Figure 1 is an elevation of my device adapted to be used as a terminal, the wall or floor being shown in section; Fig. 2 is a face view of the flanged sphere supporting member; Fig. 3 is a sectional view of my invention when adapted for use where the angle for the piping on both sides may be varied and Fig. 4 is a sectional view of the latter showing the direction of the pipe changed by the rotation of one section of the sphere relative to the other section.

Same reference characters indicate like parts in the several figures.

In said drawings 1 is a sphere having a central bore 2 tapped at one or both ends as seen at 3 to receive the threaded end of pipe 4. In Fig. 1 the device is adapted to be used as a terminal and the sphere is, therefore, not necessarily divided if it does not matter what angle the discharge takes relative to the wall or floor. In this case the sphere is provided with a flanged supporting member 5 concaved to fit the surface of the sphere closely and with a keeper 6 similarly concaved and adapted to be bonded to the flanged member 5 by screws 7 so that the sphere may be retained therebetween and rotated or turned in said supporting members through a wide range. To increase this range, the plane of the faces 13 of members 5 and 6 are inclined to the adjacent faces which are parallel to the wall or floor. The members 5 and 6 should be of such an extent as to retain the sphere and guide its movements. The member 5 is provided with a flange 9 which is adapted to be secured to the wall or floor by nails or screws 10. When it is desired to change the direction of the pipe on the opposite side of the wall or floor, the sphere is divided in a plane inclined to the bore as seen at 11 in Figs. 3 and 4 and it may be desirable to provide a circular male and female joint in the meeting faces as seen at 12 to give a tighter joint.

The operation of my invention will be readily apparent. In the form shown in Fig. 1, where the sphere is undivided and which is specially designed for use as an exhaust pipe terminal, the sphere is turned up or down or sidewise until the tap is in the right position to receive the end of the pipe. In the form shown in Figs. 3 and 4 the sphere is moved as before until the tap is in position to receive the pipe on one side and then the opposite member of the sphere is rotated in the support and upon the other member until the tap is in position to receive the end of the pipe. In the latter case it will be noted that the sphere may move as a whole in its support or either part may be rotated independently of the other part.

I claim:—

1. In a device of the character described, a divided sphere provided with a pipe receiving tap and a support for said sphere consisting of two members concaved to fit said sphere and fastened together, said supporting members having their outside faces inclined to their adjacent faces.

2. In a device of the character described, a sphere provided with pipe receiving taps at opposite ends and divided transversely on a line inclined to said ends and a support for said sphere comprising two members concaved to fit said sphere and fastened together said supporting members having their outside faces inclined to their adjacent faces, the adjacent faces of said members being spaced apart.

MILTON D. THOMPSON.

Witnesses:
 CHARLES L. FOSTER,
 ELGIN C. VERRILL.